A. J. NELLIS.
Hay-Elevators.
No. 153,269. Patented July 21, 1874.
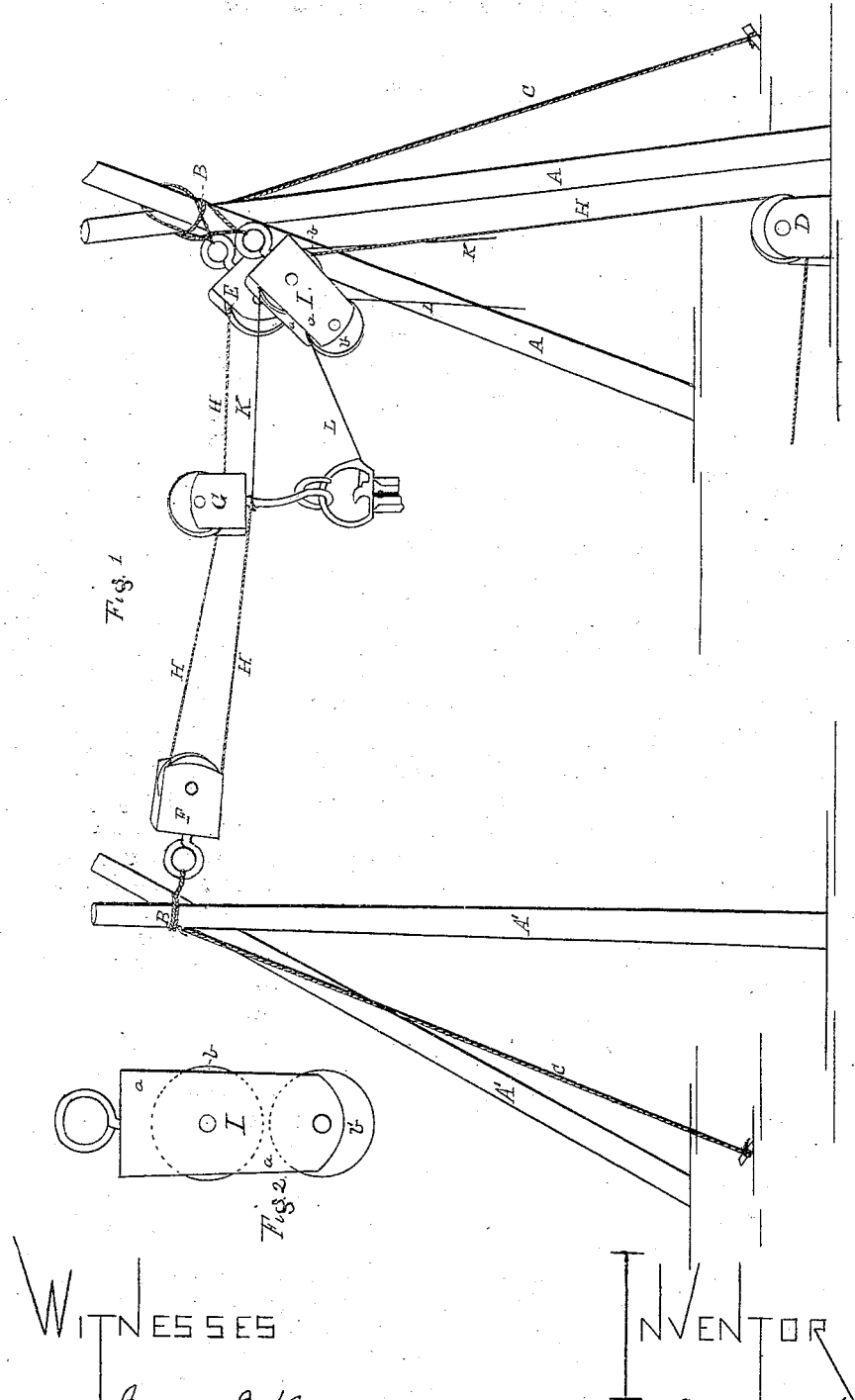
Witnesses
James D. Kay
Frederick Standish
Inventor
Aaron J. Nellis
by Bakewell & Kerr
Attorneys

UNITED STATES PATENT OFFICE.

AARON J. NELLIS, OF PITTSBURG, PENNSYLVANIA.

IMPROVEMENT IN HAY-ELEVATORS.

Specification forming part of Letters Patent No. 153,269, dated July 21, 1874; application filed May 16, 1874.

*To all whom it may concern:*

Be it known that I, AARON J. NELLIS, of Pittsburg, in the county of Allegheny and State of Pennsylvania, have invented a new and useful Improvement in Stackers and Conveyers; and I do hereby declare the following to be a full, clear, and exact description thereof, reference being had to the accompanying drawing forming a part of this specification, in which—

Figure 1 is a view of my improved stacker, and Fig. 2 is a view of the double pulley-block.

This invention relates to that class of devices for loading hay from stacks onto wagons, unloading hay from wagons into barns, for making stacks, and similar purposes; and it consists in combining with the hoister-rope and pulleys an additional rope attached to the fork-pulley, and passing over a pulley or other suitable device for controlling the travel of the fork; and, secondly, in combining with the hoister-rope and pulleys the double block for the additional rope and trip-rope, so that the relative positions of the said ropes will be such that they can be operated by one person and from any desired position.

In the drawing referred to, A A and A' A' represent poles, which may be from twenty-five to thirty-five feet long, according to the position in which they are to be used. These poles are fastened together at their small ends by ropes or chains, as shown at B, and supported in an upright position by guys C, passing to stakes driven into the ground. D represents a pulley-block secured near the base of one of the poles A; E, a second, fastened at the point where the two poles A A cross; F, a third, fastened at the point where the poles A' A' cross. G represents the fork-pulley, and H represents the hoister-rope. This rope is passed under the first pulley, D, over the second, E, and then the fork-pulley G is placed upon the rope. The rope is then passed over the pulley F, brought back, and connected to the fork-pulley, as shown in the drawing. To this extent the devices are of the usual construction; and in the use of said devices a serious objection arises from the tendency of the loaded fork to sag and drag over and catch upon obstructions, and in barns, to catch under the beams, requiring constant attention and handling.

To overcome these objections, I provide what I term a "graduating-cord," and suitable blocks therefor, which I will now specifically describe.

I represents a double pulley of the following form: Within the casing *a*, which may be of wrought-iron or other suitable material, and is made more than twice the usual length, I place two wheels, *b b'*, preferably one above the other, as shown in the drawing. This pulley is attached to the poles A A at their point of crossing, close to pulley E, or at any convenient point that will enable the draft on the graduating-cord to be made in the same direction as the draft on the fork. K represents a graduating-rope attached to the fork-pulley, and passing thence over the upper wheel of the double pulley-block I. By means of this rope I am enabled at all times to control the travel of the fork. L represents the trip-cord or line passing from the fork over the lower pulley of the double pulley-block. This is the common trip-cord; but, by passing it through the double pulley-block, or over the same pulley with the graduating-rope in a single block, I am enabled to carry both the graduating-rope and the trip-rope to the same point, and operate them therefrom, so that one person, in such a position as shall be most advantageous, may control both the travel of the fork and the discharging devices thereof.

The operation of my devices is as follows: The horse being hitched to the end of rope H, and the fork passed into the hay to be lifted, the draft made upon rope H is transmitted back to the pulley-fork, which travels over the rope, up toward the point of crossing of the poles A' A', where the pulley-block F is attached.

Heretofore the inclination of the fork and its load, throughout three-fourths of its travel, has been to drag along the surface and over the obstacles in the way; but, by proper tension made upon the graduating-cord K, the tendency during the first part of the movement is to rise toward the position of the pulley-block E, or the point where the poles A A cross, and from thence travel horizontally across to the pulley-block F, thus overcoming any tendency of the fork and its load to drag, and enabling me to discharge the load at any point of the travel of the fork between the pulleys E and F.

When the hay is discharged from the fork, proper draft made upon the graduating-cord I causes the fork to travel horizontally back toward pulley E, avoiding any tendency to drag or catch under beams of the barn or other obstruction. By passing the trip-cord over a wheel in the same pulley-block, the person who operates the graduating-cord can at the same time control the fork.

The advantages of this invention have been fully set forth in the statement of the operation.

Having thus described my invention, I claim—

1. In combination with the hoister-rope H and the pulleys E F G, double pulley-block I, for the passage of the graduating-cord K and trip-cord L, substantially as specified.

2. In combination with the hoister-rope H and pulleys E F G, a graduating-cord, K, substantially as and for the purpose specified.

In testimony whereof I, the said AARON J. NELLIS, have hereunto set my hand.

AARON J. NELLIS.

Witnesses:
 LOUIS HAGER,
 JAMES I. KAY.